(12) United States Patent
Paiva et al.

(10) Patent No.: US 8,412,651 B2
(45) Date of Patent: Apr. 2, 2013

(54) CHARACTERIZING DATASETS USING SAMPLING, WEIGHTING, AND APPROXIMATION OF AN EIGENDECOMPOSITION

(75) Inventors: Antonio Rafael Paiva, Salt Lake City, UT (US); Tolga Tasdizen, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 328 days.

(21) Appl. No.: 12/875,330

(22) Filed: Sep. 3, 2010

(65) Prior Publication Data

US 2012/0059777 A1 Mar. 8, 2012

(51) Int. Cl.
G06N 5/00 (2006.01)
(52) U.S. Cl. .......................................... 706/12; 706/45
(58) Field of Classification Search .................... 706/12, 706/45
See application file for complete search history.

(56) References Cited

PUBLICATIONS

Das, Minimum Distance Estimators for Nonparametric Models With Grouped Dependent Variables, Discussion Paper Series, Discussion Paper No. 0102-41, Columbia University, Dept. of Economics, Mar. 2002, pp. 1-33.*
Scholkopf et al., Nonlinear component analysis as a kernel eigenvalue problem, Neural Computation, vol. 10, No. 5, pp. 1299-1319, 1998.
Ng et al., On spectral clustering: Analysis and an algorithm, Advances in Neural Information Processing Systems, vol. 14, 2001.
Shi et al., Normalized cuts and image segmentation, IEEE Transactions on Pattern Analysis and Machine Intelligence, vol. 22, No. 8, pp. 888-905, Aug. 2000.
Williams et al., Using the Nyström method to speed up kernel machines, Advances in Neural Information Processing Systems, Vancouver, BC, Dec. 2000.
Fowlkes et al., Spectral grouping using the Nyström method, IEEE Transactions on Pattern Analysis and Machine Intelligence, vol. 26, No. 2, pp. 214-225, Feb. 2004.
Smola et al., Sparse greedy matrix approximation for machine learning, Proceedings of the International Conference on Machine Learning, Stanford, CA, USA, Jul. 2000.

(Continued)

*Primary Examiner* — Wilbert L Starks
(74) *Attorney, Agent, or Firm* — Bell & Manning, LLC

(57) ABSTRACT

A method, a system, and a computer-readable medium are provided for characterizing a dataset. A representative dataset is defined from a dataset by a computing device. The representative dataset includes a first plurality of data points and the dataset includes a second plurality of data points. The number of the first plurality of data points is less than the number of the second plurality of data points. The data point is added to the representative dataset if a minimum distance between the data point and each data point of the representative dataset is greater than a sampling parameter. The data point is added to a refinement dataset if the minimum distance between the data point and each data point of the representative dataset is less than the sampling parameter and greater than half the sampling parameter. A weighting matrix is defined by the computing device that includes a weight value calculated for each of the first plurality of data points based on a determined number of the second plurality of data points associated with a respective data point of the first plurality of data points. The weight value for a closest data point of the representative dataset is updated if the minimum distance between the data point and each data point of the representative dataset is less than half the sampling parameter. A machine learning algorithm is executed by the computing device using the defined representative dataset and the defined weighting matrix applied in an approximation for a computation of a full kernel matrix of the dataset to generate a parameter characterizing the dataset.

18 Claims, 13 Drawing Sheets

PUBLICATIONS

Ouimet et al., Greedy spectral embedding, Proceedings of the International Workshop on Artificial Intelligence and Statistics, Barbados, Jan. 2005.

Engel et al., The kernel recursive least-squares algorithm, IEEE Transactions on Signal Processing, vol. 52, No. 8, pp. 2275-2285, 2004.

Yan et al., Fast approximate spectral clustering, Proceedings of the ACM International Conference on Knowledge Discovery and Data Mining, Paris, France, Jun. 2009.

Platt et al., A resource-allocating network for function interpolation, Neural Computation, vol. 3, No. 2, pp. 213-225, 1991.

Paiva et al., Fast semi-supervised image segmentation by novelty selection, Proceedings of the IEEE International Conference on Acoustics, Speech, and Signal Processing, Dallas, TX, Mar. 2010.

Weiss, Segmentation using eigenvectors: a unifying view, Proceedings of the International Conference on Computer Vision, 1999.

Zhang et al., Density-Weighted Nyström Method for Computing Large Kernel Eigensystems, Neural Computation 21, Massachusetts Institute of Technology, pp. 121-146, 2009.

\* cited by examiner

CHARACTERIZING DATASETS USING SAMPLING, WEIGHTING, AND APPROXIMATION OF AN EIGENDECOMPOSITION

REFERENCE TO GOVERNMENT RIGHTS

This invention was made with government support under R01 EB005832 awarded by the National Institutes of Health. The Government has certain rights in this invention.

BACKGROUND

Kernel and graph methods revolutionized machine learning by providing the ability to solve nonlinear problems analytically. Well known kernel and graph methods include support vector machines, kernel principal component analysis, spectral clustering, and normalized cuts. These methods extend many linear statistical data analysis techniques. Compared to other nonlinear methods, such as neural networks, a key advantage in the use of kernel and graph methods is that kernel and graph methods provide a unique global solution. For this reason, kernel and graph methods can be solved analytically or using fast optimization techniques. However, the ability to solve nonlinear problems exactly comes at the cost of needing to handle all pairwise combinations of data points in a dataset, which results in a problem with a computational complexity of at least $O(N^2)$, where N is the number of data points. The computational complexity has limited the applicability of kernel and graph methods to large datasets because storing the matrix of all pairwise interactions is a formidable task for more than a few tens of thousands of data points and because computing the eigendecomposition, or inverse of this matrix, as required by many of these methods, poses yet another major challenge.

SUMMARY

In an illustrative embodiment, a method for characterizing a dataset is provided. A representative dataset is defined from a dataset by a computing device. The representative dataset includes a first plurality of data points and the dataset includes a second plurality of data points. The number of the first plurality of data points is less than the number of the second plurality of data points. The data point is added to the representative dataset if a minimum distance between the data point and each data point of the representative dataset is greater than a sampling parameter. The data point is added to a refinement dataset if the minimum distance between the data point and each data point of the representative dataset is less than the sampling parameter and greater than half the sampling parameter. A weighting matrix is defined by the computing device that includes a weight value calculated for each of the first plurality of data points based on a determined number of the second plurality of data points associated with a respective data point of the first plurality of data points. The weight value for a closest data point of the representative dataset is updated if the minimum distance between the data point and each data point of the representative dataset is less than half the sampling parameter. A machine learning algorithm is executed by the computing device using the defined representative dataset and the defined weighting matrix applied in an approximation for a computation of a full kernel matrix of the dataset to generate a parameter characterizing the dataset.

In another illustrative embodiment, a computer-readable medium is provided having stored thereon computer-readable instructions that when executed by a computing device, cause the computing device to perform the method of characterizing a dataset.

In yet another illustrative embodiment, a system is provided. The system includes, but is not limited to, a processor and the computer-readable medium operably coupled to the processor. The computer-readable medium has instructions stored thereon that when executed by the processor, cause the system to perform the method of characterizing a dataset.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
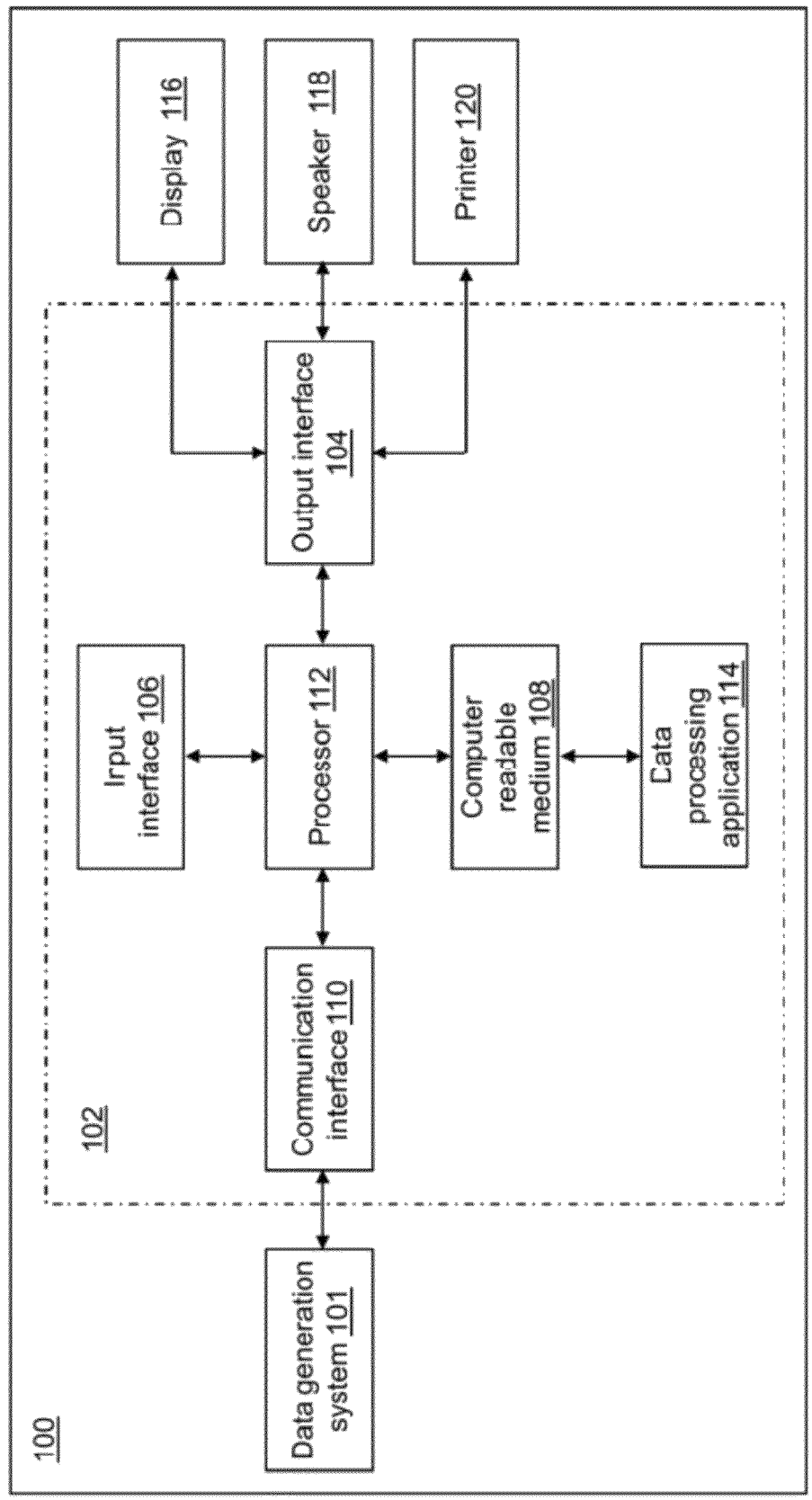
FIG. 1 depicts a block diagram of a data processing system in accordance with an illustrative embodiment.

With reference to FIG. 1, a block diagram of a data processing system 100 is shown in accordance with an illustrative embodiment. Data processing system 100 may include a data generation system 101 and a computing device 102. Data generation system 101 generates data in two-dimensions, three-dimensions, four-dimensions, etc. for processing by computing device 102. The source of and the dimensionality of the data generated using data generation system 101 is not intended to be limiting. In an illustrative embodiment, data generation system 101 includes a sensor such as a radar, an infrared sensor, an optical sensor, a sound sensor, etc. For example, the sensor may be a camera or a microphone. Alternatively, the sensor may be a satellite based synthetic aperture radar that obtains three-dimensional terrain data of the earth's surface. As another alternative, the sensor may be an infrared sensor that obtains thermal data of an object. As yet another alternative, the sensor may be part of a medical imaging system such as a magnetic resonance imaging device, a computed tomography scanner, an ultrasound device, an x-ray machine, etc. The type of sensor is not intended to be limiting and is intended to include any type of sensor for measuring the electrical, electro-mechanical, biological, chemical, and/or mechanical properties of an object.

Computing device 102 may include an output interface 104, an input interface 106, a computer-readable medium 108, a communication interface 110, a processor 112, and a data processing application 114. Computing device 102 may be a computer of any form factor. Different and additional components may be incorporated into computing device 102.

Output interface 104 provides an interface for outputting information for review by a user of data processing system 100. For example, output interface 104 may include an interface to a display 116, a speaker 118, a printer 120, etc. Display 116 may be a thin film transistor display, a light emitting diode display, a liquid crystal display, or any of a variety of different displays known to those skilled in the art. Speaker 118 may be any of a variety of speakers as known to those skilled in the art. Printer 120 may be any of a variety of printers as known to those skilled in the art. Data processing system 100 may have one or more output interfaces that use the same or a different interface technology.

Input interface 106 provides an interface for receiving information from the user for entry into computing device 102 as known to those skilled in the art. Input interface 106 may use various input technologies including, but not limited to, a keyboard, a pen and touch screen, a mouse, a track ball, a touch screen, a keypad, one or more buttons, etc. to allow the user to enter information into computing device 102 or to make selections presented in a user interface displayed on display 116. Input interface 106 may provide both an input and an output interface. For example, a touch screen both allows user input and presents output to the user. Computing device 102 may have one or more input interfaces that use the same or a different input interface technology.

Computer-readable medium 108 is an electronic holding place or storage for information so that the information can be accessed by processor 112 as known to those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. Computing device 102 may have one or more computer-readable media that use the same or a different memory media technology. Computing device 102 also may have one or more drives that support the loading of a memory media such as a CD or DVD. Computer-readable medium 108 may comprise a cache in which data can be stored temporarily for rapid access by processor 112. Computer-readable medium 108 further may comprise a file system in which data files are stored and organized for access by processor 112.

Communication interface 110 provides an interface for receiving and transmitting data between devices using various protocols, transmission technologies, and media as known to those skilled in the art. The communication interface may support communication using various transmission media that may be wired or wireless. Computing device 102 may have one or more communication interfaces that use the same or a different communication interface technology. Data may be transferred between computing device 102 and data generation system 101 using communication interface 110. Additionally, communication interface 110 may provide connectivity to other systems. For example, communication interface 110 may provide connectivity to a remote file system or database.

Processor 112 executes instructions as known to those skilled in the art. The instructions may be carried out by a special purpose computer, logic circuits, or hardware circuits. Thus, processor 112 may be implemented in hardware, firmware, or any combination of these methods. The term "execution" is the process of running an application or the carrying out of the operation called for by an instruction. The instructions may be written using one or more programming language, scripting language, assembly language, etc. Processor 112 executes an instruction, meaning that it performs the operations called for by that instruction. Processor 112 operably couples with output interface 104, with input interface 106, with memory 108, and with communication interface 110 to receive, to send, and to process information. Processor 112 may retrieve a set of instructions from a permanent memory device and copy the instructions in an executable form to a temporary memory device that is generally some form of RAM. Computing device 102 may include a plurality of processors that use the same or a different processing technology.

Data processing application 114 performs operations associated with processing a dataset generated by data generation system 101 as part of a supervised and/or unsupervised machine learning process that calculates parameters characterizing the dataset. The machine learning process may be, for example: a dimensionality algorithm, such as kernel principal components, isometric mapping (commonly known as ISOMAP), laplacian eigenmaps, etc.; or a clustering algorithm, such as any algorithm of the spectral clustering family of algorithms; or regression, as in kernel regression; or semi-supervised learning algorithm. These methods may compute a kernel or affinity or graph matrix for a dataset and use this matrix to derive a characterization for the dataset. For example, the eigenvectors and eigenvalues of the kernel or affinity or graph matrix determined for a dataset may be used to characterize the dataset. In another example, the inverse kernel or affinity matrix may be used to derive regression parameters that characterize the dataset, or propagate labels input by the input interface 106 or from another data process accessible through communication interface 110 or from other data processing application 114. In yet another example, an alternative matrix, such as the graph Laplacian matrix, can be derived to characterize the dataset.

Some or all of the operations described may be embodied in data processing application 114. The operations may be implemented using hardware, firmware, software, or any combination of these methods. With reference to the illustrative embodiment of FIG. 1, data processing application 114 is implemented in software stored in computer-readable medium 108 and accessible by processor 112 for execution of the instructions that embody the operations of image data processing application 114. Data processing application 114 may be written using one or more programming languages, assembly languages, scripting languages, etc.

Components of data processing system 100 may be positioned in a single location, a single facility, and/or may be remote from one another. Data generation system 101 and computing device 102 may be integrated into a single system. Data generation system 101 and computing device 102 may be connected directly. For example, data generation system 101 may connect to computing device 102 using a cable for transmitting information between data generation system 101 and computing device 102. Data generation system 101 may connect to computing device 102 using a network. Data may be stored electronically and accessed using computing device 102. Data generation system 101 and computing device 102 may not be connected. Instead, the data acquired using data generation system 101 may be manually provided to computing device 102. For example, the data may be stored on electronic media such as a CD, a DVD, a flash drive, etc. After receiving the data, computing device 102 may initiate processing of the data automatically or under control of an operator of computing device 102.

Figure 2:
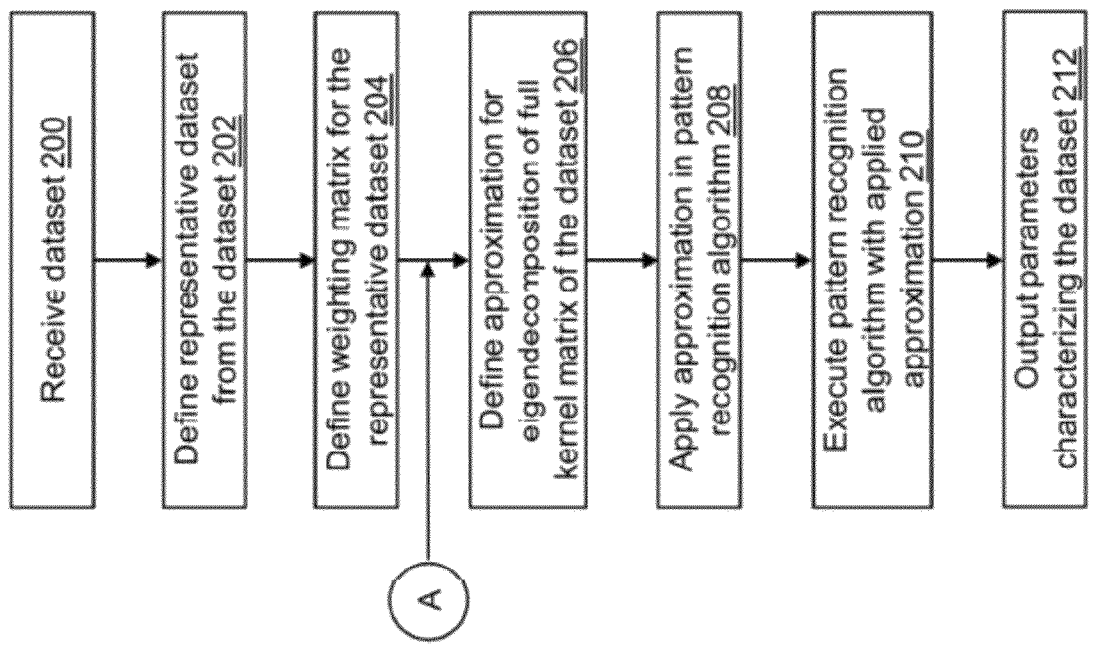
FIG. 2 depicts a first flow diagram illustrating first illustrative operations performed by the data processing system of FIG. 1 in accordance with an illustrative embodiment.

With reference to FIG. 2, illustrative operations associated with data processing application 114 of FIG. 1 are described. Additional, fewer, or different operations may be performed, depending on the embodiment. The order of presentation of the operations of FIG. 2 is not intended to be limiting. Thus, the order of the operations shown in FIG. 2 may be performed in an order different from that shown in FIG. 2. In an operation 200, a dataset is received. For example, the dataset may be stored at computing device 102 and selected for input to data processing application 114 which receives the dataset as an input. As another alternative, the dataset may be streamed to computing device 102 from data generation system 101.

In an operation 202, a representative dataset is defined from the received dataset. The representative dataset is a subset of the received dataset defined to approximate the received dataset using fewer data points. Various methods for defining the representative dataset may be used. For example, the data points within the dataset may be assigned to clusters where the representative dataset includes a data point for each cluster. In an illustrative embodiment, the data point is a calculated center of the cluster as calculated based on the data points assigned to the cluster. Another method for defining a representative dataset has been proposed in the paper by A. J. Smola and B. Schölkopf titled "Sparse greedy matrix approximation for machine learning" and published in *Proceedings of the International Conference on Machine Learning*, Stanford, Calif., USA, July 2000, in which the representative dataset is determined by minimizing the trace of the difference between a full and a reduced kernel matrix. Another method for defining a representative dataset has been proposed in the paper by M. Ouimet and Y. Bengio titled "Greedy spectral embedding" and published in *Proceedings of the International Workshop on Artificial Intelligence and Statistics*, Barbados, January 2005, in which the representative dataset is determined by searching for the set of data points that approximately spans the same space as all the data points. Still other methods for defining a representative dataset have been proposed in the paper by Y. Engel, S. Mannor, and R. Meir titled "The kernel recursive least-squares algorithm" and published in *IEEE Transactions on Signal Processing*, vol. 52, no. 8, pp. 2275-2285, 2004, and the paper by D. Yan, L. Huang, and M. I. Jordan titled "Fast approximate spectral clustering," and published in *Proceedings of the ACM International Conference on Knowledge Discovery and Data Mining*, Paris, France, June 2009.

In another illustrative embodiment, a data point is added to the representative dataset only if the smallest distance to all other data points in the representative dataset is larger than a sampling parameter, $\delta$. In effect, a data point is selected if the data point provides novel information about the received dataset, which ensures that enough data points are kept to completely cover the space while keeping the number of data points needed to achieve this covering to a minimum.

In an operation 204, a weighting matrix is defined for the defined representative dataset to reflect the density of the data points in the received dataset. For example, the weighting matrix is defined such that a weight is assigned to each data point in the defined representative dataset based on the number of data points in the received dataset that are associated with that data point in the defined representative dataset. As a result, the weight indicates how many data points are summarized by a representative data point so that representative data points having larger weights correspond to areas within the received dataset having a higher density.

Figure 3:
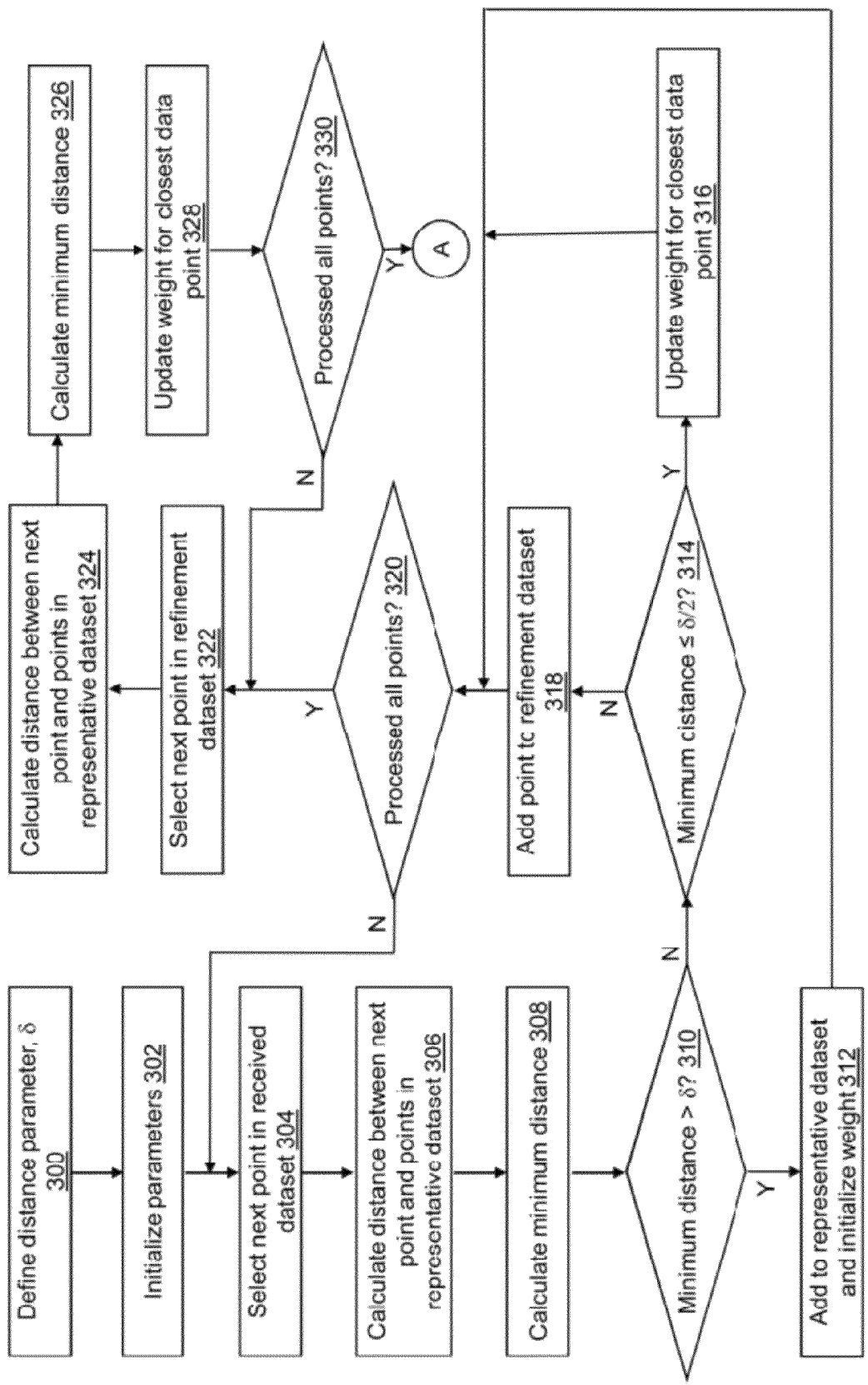
FIG. 3 depicts a first flow diagram illustrating second illustrative operations performed by the data processing system of FIG. 1 in accordance with an illustrative embodiment.

In an illustrative embodiment, operations 202 and 204 can be performed together as shown with reference to FIG. 3. With reference to FIG. 3, illustrative operations associated with operations 202 and 204 of FIG. 2 are described. Additional, fewer, or different operations may be performed, depending on the embodiment. The order of presentation of the operations of FIG. 3 is not intended to be limiting. Thus, the order of the operations shown in FIG. 3 may be performed in an order different from that shown in FIG. 3. In an operation 300, a sampling parameter, $\delta$ is defined. In an illustrative embodiment, the sampling parameter, $\delta$, is defined by a user as an input. The user may select the sampling parameter, $\delta$, based on the type of machine learning technique to be applied to the representative dataset. For example, the sampling parameter, $\delta$, may be selected based on a value of a kernel size parameter, $\sigma$. In general, the choice of $\delta$ represents a trade-off between the reduction in computation complexity and memory requirements, and the approximation error. Sampling parameter values within $[\sigma/2, \sigma]$ have been observed to generally yield good results.

In other embodiments, the sampling parameter, $\delta$, is defined based on an analysis of the maximum and minimum values of the data points in the received dataset. In still other embodiments, a plurality of sampling parameters may be defined over a range of values. Each of the plurality of sampling parameters is used to determine the number of data points that result in the representative dataset determined using each of the plurality of sampling parameters. Based on a comparison of the number of data points in each representative dataset, one of the sampling parameters is selected based on a desired number of data points in the representative dataset.

In an operation 302, parameters are initialized. For example, the representative dataset is initialized to include a first data point from the received dataset, the weighting matrix is initialized to include a weight value of one associated with the first data point of the representative dataset, and a refinement dataset is initialized as an empty set. The representative dataset and the refinement dataset may be used to store actual values associated with the data points or indexes to an array that stores the actual values. The weighting matrix may be used to store actual values for the weight associated with each data point in the representative dataset. The representative dataset, weighting matrix, and the refinement dataset may be implemented using any of a variety of software structures such as arrays, lists, linked lists, memory block, etc.

In an operation 304, a next data point is selected from the received dataset. In an operation 306, a distance is calculated between the selected next data point and each data point in the representative dataset. In an operation 308, a minimum distance of the distances calculated in operation 306 is calculated. In an operation 310, the calculated minimum distance is compared to the defined sampling parameter. If the calculated minimum distance is greater than the defined sampling parameter, in an operation 312, the selected next data point is added to the representative dataset, and processing continues at an operation 320. If the calculated minimum distance is not greater than the defined sampling parameter, in an operation 314, the calculated minimum distance is compared to half the defined sampling parameter. If the calculated minimum distance is less than or equal to half the defined sampling parameter, in an operation 316, the weight associated with the data point in the representative dataset that resulted in the calculated minimum distance is updated by one, and processing continues at operation 320. If the calculated minimum distance is not less than or equal to half the defined sampling parameter, in an operation 318, the data point is added to the refinement dataset.

In operation 320, a determination is made concerning whether or not all of the points in the received dataset have been processed. If all of the points in the received dataset have not been processed, processing continues in operation 304 by selecting a next data point in the received dataset. If all of the points in the received dataset have been processed, processing continues in an operation 322.

In operation 322, a next data point in the refinement dataset is selected. Of course, initially, a first data point in the refinement dataset is selected. If the refinement dataset is empty, processing may continue in an operation 206 as shown with reference to FIG. 2. In an operation 324, a distance is calculated between the selected next data point in the refinement dataset and each data point in the representative dataset. In an operation 326, a minimum distance of the distances calculated in operation 324 is calculated. In an operation 328, the weight associated with the data point in the representative dataset that resulted in the calculated minimum distance is updated by one, and processing continues at an operation 330. In operation 330, a determination is made concerning whether or not all of the points in the refinement dataset have been processed. If all of the points in the refinement dataset have not been processed, processing continues in operation 322 by selecting a next data point in the refinement dataset. If all of the points in the refinement dataset have been processed, processing may continue in operation 206 shown with reference to FIG. 2.

In operation 206, an approximation for the eigendecomposition of the full kernel matrix of the received dataset is defined. To approximate the eigendecomposition on the full kernel matrix, the rows and columns of the kernel matrix of the representative dataset are scaled by the square root of the corresponding number of data points assigned to each data point in the representative dataset. Given the set of all data points $X=\{x_1, x_2, \ldots, x_N\}$ in the received dataset where X has N data points, denoting the full kernel matrix by K, that is, the matrix with $K_{ij}=\kappa(x_i,x_j)$, with $\kappa$ the kernel function, denoting the representative dataset by $X^R \subset X$, where $X^R$ has M data points, and denoting the kernel matrix of the representative dataset by $K_R$, with entries given by $k_{ij}=\kappa(x'_i,x'_j)$, $x'_i,x'_j \in X^R$. The approximation of the eigendecomposition of the full kernel matrix is derived considering that $$K = E K_R E^T, \quad (1)$$

where E is an N×M matrix with the (i,m) entry equal to one if $x_i \in X$ has been assigned to the m-th representative point, and zero otherwise. This is equivalent to the data points being divided into M clusters $\{C_m : m=1, \ldots, M\}$ such that for any two points $x_i,x_j$ within the same cluster $\kappa(x_i,x_j)=\kappa(x_i,x_i)=\kappa(x_j,x_j)$, for any data points $x_i,x_j \in C_m$ and $x_k,x_l \in C_n$, $m \neq n$, $\kappa(x_i,x_k) = \kappa(x_j,x_l)$, and $X^R = \{x'_m : x'_m \in C_m, m=1, \ldots, M\}$. In other words, the assumption is made that substituting $\kappa(x_i,x_j)$ by $\kappa(x'_k,x'_l)$, where $x'_k,x'_l$ are the representative points for $x_i,x_j$, results in zero error. In practice, the error is not exactly zero, and equation (1) is an approximation of the structure of the full kernel matrix, K. Nevertheless, as long as the sampling parameter, δ is small compared to a kernel size σ, the error introduced by the approximation is small.

Letting $G = W^{1/2} K_R W^{1/2}$, where W is an M×M diagonal matrix with i-th diagonal entry equal to the weight corresponding to the i-th representative data point, $W_{ii}=w_i$. Moreover, consider that G has eigendecomposition $G=VUV^T$, where V is the M×M orthonormal matrix of eigenvectors and U is the diagonal matrix with the corresponding eigenvalues. Then, considering that equation (1) is true, the eigendecomposition of K is given by $$K = [EW^{-1/2}V \quad Z] \begin{bmatrix} U & 0 \\ 0 & 0 \end{bmatrix} \begin{bmatrix} (EW^{-1/2}V)^T \\ Z^T \end{bmatrix} \quad (2)$$

where Z is an N×(N−M) matrix of orthonormal column vectors such that $Z^T(EW^{-1/2}V)=0$.

The theorem defined by $G=W^{1/2}K_R W^{1/2}$ highlights that the eigendecomposition of the kernel matrix for a subset of the data points is not an adequate approximation to the eigendecomposition of the full kernel matrix. First, $W^{1/2}$ is used to scale $K_R$ such that $G_{ij}=\sqrt{w_i w_j}\kappa(x_i,x_j)$. This scaling summarizes the interactions between data points assigned to two representative data points. For example, if a representative data point has many more points than others assigned to it, the weight associated with this representative data point is higher. Intuitively, this observation seems reasonable because these entries characterize an important feature of the data distribution, which should be preserved in the eigendecomposition. Second, $W^{-1/2}$ is used to transform V such that, when multiplied by E, it spans the same space as the eigenvectors of K. In general, the eigenspace of $K_R$ is different from the eigenspace of K. However, the weighting matrix compensates for these differences. Thus, equation (2) provides an approximation for the eigendecomposition of the full kernel matrix.

In an operation 208, the approximation for the eigendecomposition of the full kernel matrix is applied in a machine learning algorithm where a machine learning algorithm is a sequence of computer-executable instructions for solving a machine learning problem. The application is dependent upon the machine learning algorithm, but in each application, the weights associated with each representative data point are used to appropriately scale the kernel matrix of the representative dataset.

As an illustrative application, principal component analysis (PCA) is a well known statistical data analysis and dimensionality reduction technique. However, its analysis is limited to linear subspaces of the data and second-order correlations. Kernel PCA extends this concept by allowing nonlinear components and being sensitive to higher-order correlations. Thus, standard PCA can be used after "linearization" of the data, which can be achieved by mapping the input data to a high-dimensional feature space (i.e., the reproducing kernel Hilbert space (RKHS) induced by the kernel). In general, dealing with the high dimensionality of the feature space explicitly poses a major problem. Kernel PCA circumvents this issue by utilizing the so-called "kernel trick" to evaluate feature space inner products directly in the input space using the kernel function as known to a person of skill in the art.

Thus, kernel PCA allows the analytical computation of nonlinear principal components by eigendecomposition of a matrix.

Like many kernel methods, kernel PCA requires the computation of the kernel function for all pairwise combinations of data points. This means that the computation complexity of this method is order $O(N^2)$. Hence, as N increases, both the computation time and, perhaps most importantly, the memory requirements to store the kernel matrix increase tremendously, which hinders the applicability of kernel PCA to large datasets. By computing the kernel matrix on the representative dataset instead, the computation complexity and memory requirements can be significantly reduced.

In applying the approximation for the eigendecomposition of the full kernel matrix in kernel PCA, the full kernel matrix is rewritten in terms of $K_R$ and W. Kernel PCA involves two main computation steps: 1) eigendecomposition of the centered Gram matrix and 2) projection of the centered data points. The effect of centering the data in the feature space should be considered in both steps of kernel PCA.

To use the representative dataset to approximate the first step, the relationship between the centered kernel matrix of all the data, denoted $\tilde{K}$, and $K_R$ is found. From the kernel PCA algorithm, the centered kernel matrix is given by $$\tilde{K} = K - \frac{1}{N}(1_{N \times N} K + K 1_{N \times N}) + \frac{1}{N^2} 1_{N \times N} K 1_{N \times N}$$

$$= \left(I_N - \frac{1}{N} 1_{N \times N}\right) K \left(I_N - \frac{1}{N} 1_{N \times N}\right)$$

where $1_{N \times N}$ denotes the N×N matrix of all ones. Considering that equation (1) is true, we have $$\tilde{K} = \left(1_N - \frac{1}{N} 1_{N \times N}\right) E K_R E^T \left(1_N - \frac{1}{N} 1_{N \times N}\right)$$

$$= E\left(I_M - \frac{1}{N} 1_{M \times M} W\right) K_R \left(I_M - \frac{1}{N} W 1_{M \times M}\right) E^T$$

$$= E \tilde{K}_R E^T$$

using the fact that $1_{N \times N} E = 1_{N \times M} W = E1_{M \times M} W$. Because this equation has the same structure as equation (1), the same procedure can be used to compute the leading eigenvalues and eigenvectors of $\tilde{K}$ from $\tilde{K}_R$. Specifically, if the eigendecomposition of $\tilde{G} = W^{1/2} \tilde{K}_R W^{1/2}$ is $\tilde{G} = \tilde{V} \tilde{U} \tilde{V}^T$, then the M leading eigenvalues are the diagonal elements of $\tilde{U}$, with corresponding eigenvectors $EW^{-1/2}\tilde{V}$.

The eigendecomposition of $\tilde{K}$ can be used to compute the projection of the centered data points onto the first M principal components. Consider that we want to compute the projection of L data points in $X^{test}$. Denote the N×L kernel matrix between points in X and $X^{test}$ by $K^{test}$. Then, the projections of elements of $X^{test}$ onto the M first principal components is given by $$Y^{test} = A^T \left(K^{test} - \frac{1}{N} 1_{N \times N} K^{test} - \frac{1}{N} K 1_{N \times L} + \frac{1}{N^2} 1_{N \times N} K 1_{N \times L}\right) \quad (3)$$

where $A = EW^{-1/2} \tilde{V} \tilde{U}^{-1/2}$ is the N×M matrix of the first M eigenvectors of K normalized such that the principal components have unit norm in the feature space. The matrix $\tilde{U}^{-1/2}$ is used to scale the eigenvectors such that the principal components have unit norm in the RKHS space. Computing the projections in terms of the representative dataset, equation (3) can be simplified further. In this case, $K^{test} = EK_R^{test}$ where $K_R^{test}$ is the M×L matrix between points in $X^R$ and $X^{test}$. Substituting in equation (3) yields $$Y^{test} = \left(\tilde{U}^{-1/2} \tilde{V} W^{1/2}\right) \times$$

$$\left(K_R^{test} - \frac{1}{N} 1_{M \times M} W K_R^{test} - \frac{1}{N} K_R W 1_{M \times L} + \frac{1}{N^2} 1_{M \times M} W K_R W 1_{M \times L}\right)$$

which can be computed with complexity $O(M^2 L)$. If only the projections onto the first m<M principal components are needed, the computational complexity is even smaller, O(mML).

As another example, spectral clustering denotes a general family of graph-theoretic machine learning methods that utilize the spectrum and eigenvectors of the affinity matrix of the data to perform clustering. In this formulation, data points are represented by nodes in a graph, and the edge weights are given by some measure of distance or affinity (such as a kernel function) between the data points. Then, spectral clustering methods identify the cut of the data graph that best separates the clusters of data. Intuitively, the optimal cut should separate only weakly connected nodes and keep strongly connected nodes together.

A key advantage of spectral clustering methods is their ability to nonlinearly separate data clusters due to the use of local neighboring in the computation of the affinity matrix. Local neighboring can be obtained by explicitly restricting the analysis for each point to its k-nearest-neighbors or its ϵ-neighborhood, or by using radial basis function kernels that decay to zero towards infinity, such as the Gaussian kernel. Although this description naturally suggests the use of sparse affinity matrices, calculating, storing and eigendecomposing these matrices, still poses a major challenge as N becomes large.

Various spectral clustering methods have been proposed in the literature (see for example, a paper by D. Verma and M. Meila titled "A comparison of spectral clustering algorithms," University of Washington, Computer Science & Engineering Department UW-CSE-03-05-01, 2001, and a paper by Y. Weiss titled "Segmentation using eigenvectors: a unifying view" and published in *Proceedings of the International Conference on Computer Vision*, 1999.) Another well known example of a spectral clustering technique commonly used for image segmentation is described in a paper by J. Shi and J. Malik titled "Normalized cuts and image segmentation" and published in *IEEE Transactions on Pattern Analysis and Machine Intelligence*, vol. 22, no. 8, pp. 888-905, August 2000. The process outlined below can be applied similarly to other spectral clustering methods.

The algorithm proposed in a paper by A. Y. Ng, M. I. Jordan, and Y. Weiss titled "On spectral clustering: Analysis and an algorithm" and published in *Advances in Neural Information Processing Systems*, vol. 14, 2001, clusters data based on the separation of the leading eigenvectors of the normalized affinity matrix, $$L = D^{-1/2} K D^{-1/2} \quad (4)$$

where D is an N×N diagonal matrix with the i-th diagonal entry equal to the sum of the i-th row, or column, of K; that is, $$D_{ii} = \sum_{j=1}^{N} \kappa(i, j).$$

D normalizes K such that each node has unit degree. The same normalization is used in normalized cuts. To separate the data into C clusters, the C eigenvectors corresponding to the largest eigenvalues of L are used. These eigenvectors also correspond to the lowest eigenvalues of the graph's Laplacian matrix, which is known to characterize the structure of the graph. The eigenvector coefficients provide an embedding of the data points from which it is easy to separate the clusters, for example, using k-means.

In applying the approximation for the eigendecomposition of the full kernel matrix in spectral clustering, the eigendecomposition of L in equation (4) is written in the same form by substituting equation (1) in equation (4), as $$L = D^{-1/2} E K_R E^T D^{-1/2}$$
$$= E D_R^{-1/2} K_R D_R^{-1/2} E^T$$

where $D_R$ is an M×M diagonal matrix with the i-th diagonal entry given by $$[D_R]_{ii} = \sum_{j=1}^{M} w_j \kappa(x_i', x_j').$$

Written in this way, L has the same structure as K in equation (1). Therefore, according to the Theorem, the eigendecomposition of L can be obtained by first computing the eigendecomposition of $\check{G} = W^{1/2} D_R^{-1/2} K_R D_R^{-1/2} W^{1/2}$. Then, the eigenvectors of L are given by $EW^{-1/2}\check{V}$, where $\check{V}$ denotes the matrix of the eigenvectors of $\check{G}$.

With continuing reference to FIG. 2, in an operation 210, the machine learning algorithm is executed with the applied approximation for the eigendecomposition of the full kernel matrix to generate parameters characterizing the received dataset. In an operation 212, the generated parameters characterizing the received dataset are output. For example, the generated parameters may be presented to a user using display 116, may be printed using printer 120, may be stored in computer readable medium 108 or on another computer readable medium accessible using communication interface 110, etc. for application as input to a machine learning, visualization, or compression process.

Figure 4:
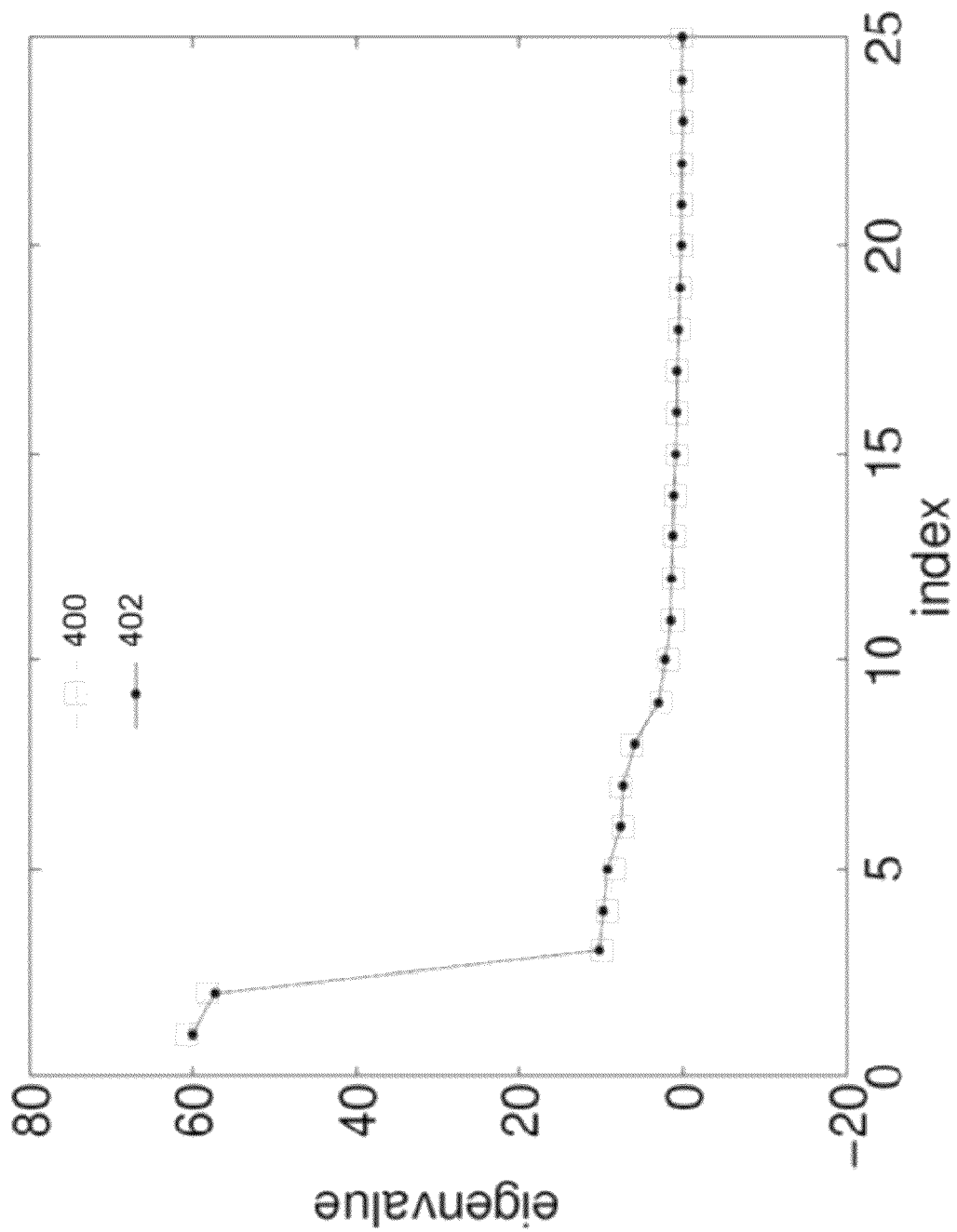
FIG. 4 depicts a comparison between the 25 largest eigenvalues of a dataset calculated using the full dataset and calculated using the method presented in FIGS. 2 and 3.
Figure 5:
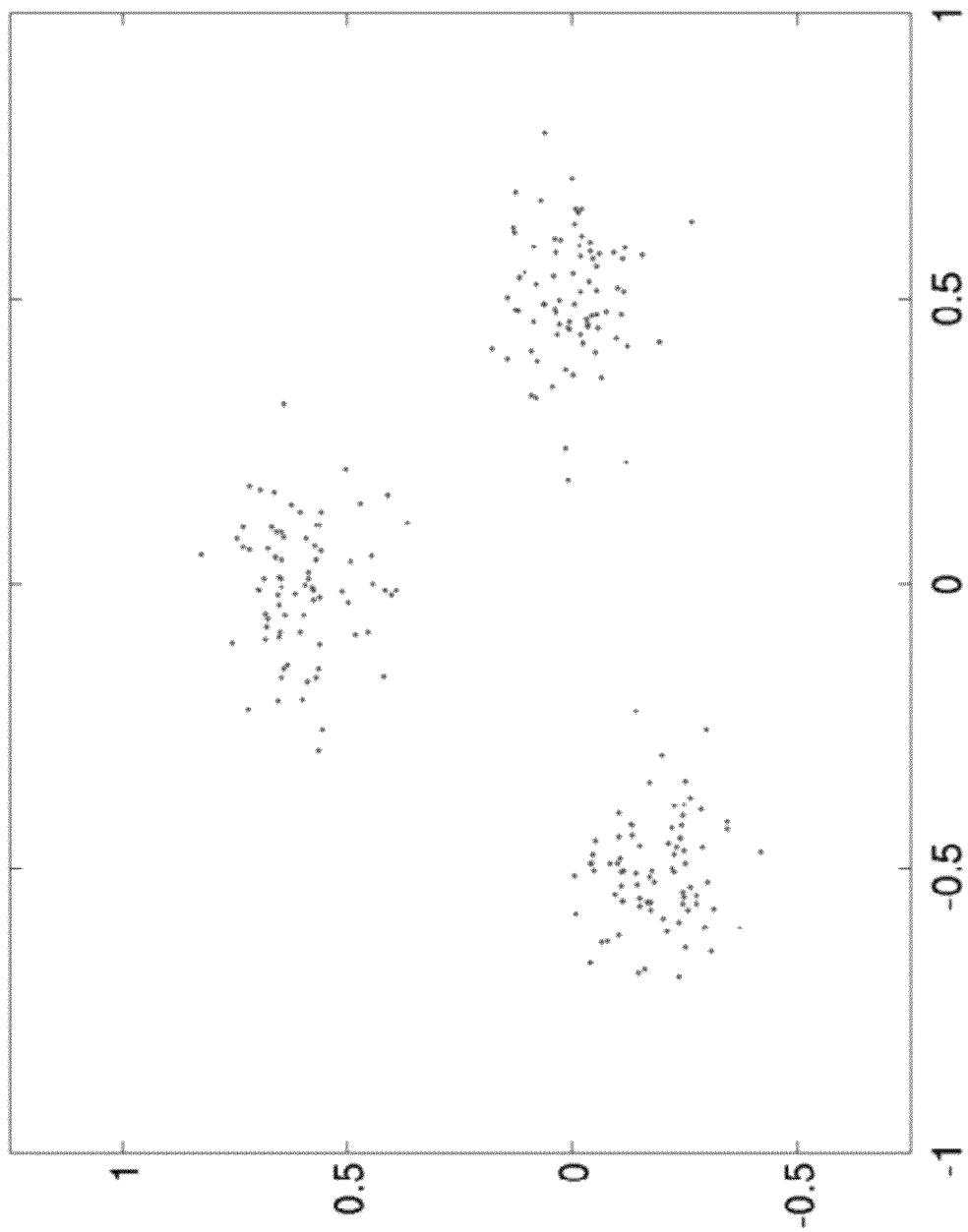
FIG. 5 depicts a dataset comprised of three separate clusters of data points.

With reference to FIG. 4, a comparison between the 25 largest eigenvalues of a dataset is shown for an example case applying kernel PCA using the full dataset and using the method presented in FIGS. 2 and 3. The dataset included three separate clusters of points with eighty points per cluster as shown with reference to FIG. 5. The points in each cluster were sampled from an isotropic normal distribution with standard deviation 0.1.

For the comparison, the Gaussian kernel $\kappa_o(x_i, x_j) = \exp(-\|x_i - x_j\|^2 / 2\sigma^2)$, with $\sigma = 0.22$, was used. The value of $\sigma$ was chosen to match the kernel size parameter of 0.1 used in the original example described in the paper by B. Schölkopf, A. Smola, and K.-R. Müller titled "Nonlinear component analysis as a kernel eigenvalue problem" and published in *Neural Computation*, vol. 10, no. 5, pp. 1299-1319, 1998 (Schölkopf et al.). A first curve 400 shows the 25 largest eigenvalues calculated for the dataset using the direct approach, which involves computing and eigendecomposing the full kernel matrix, as described in Schölkopf et al. A second curve 402 shows the 25 largest eigenvalues calculated for the dataset using the method described with reference to FIGS. 2 and 3 with the sampling parameter, $\delta$ set to 0.11, or $\sigma/2$.

Figure 6:
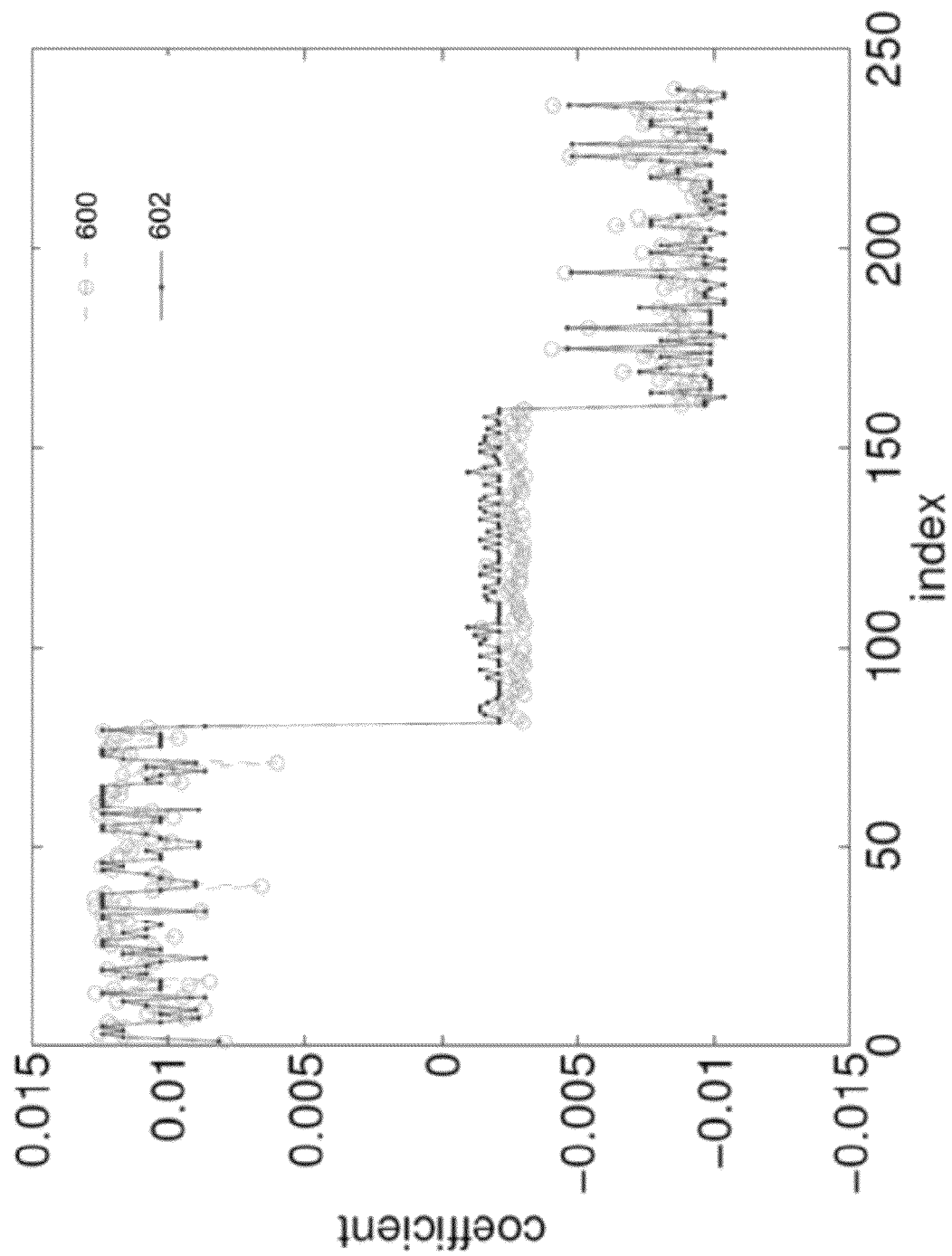
FIG. 6 depicts a comparison between the eigenvector corresponding to the first principal component of the dataset of FIG. 5 calculated using the full dataset and calculated using the method presented in FIGS. 2 and 3.
Figure 7:
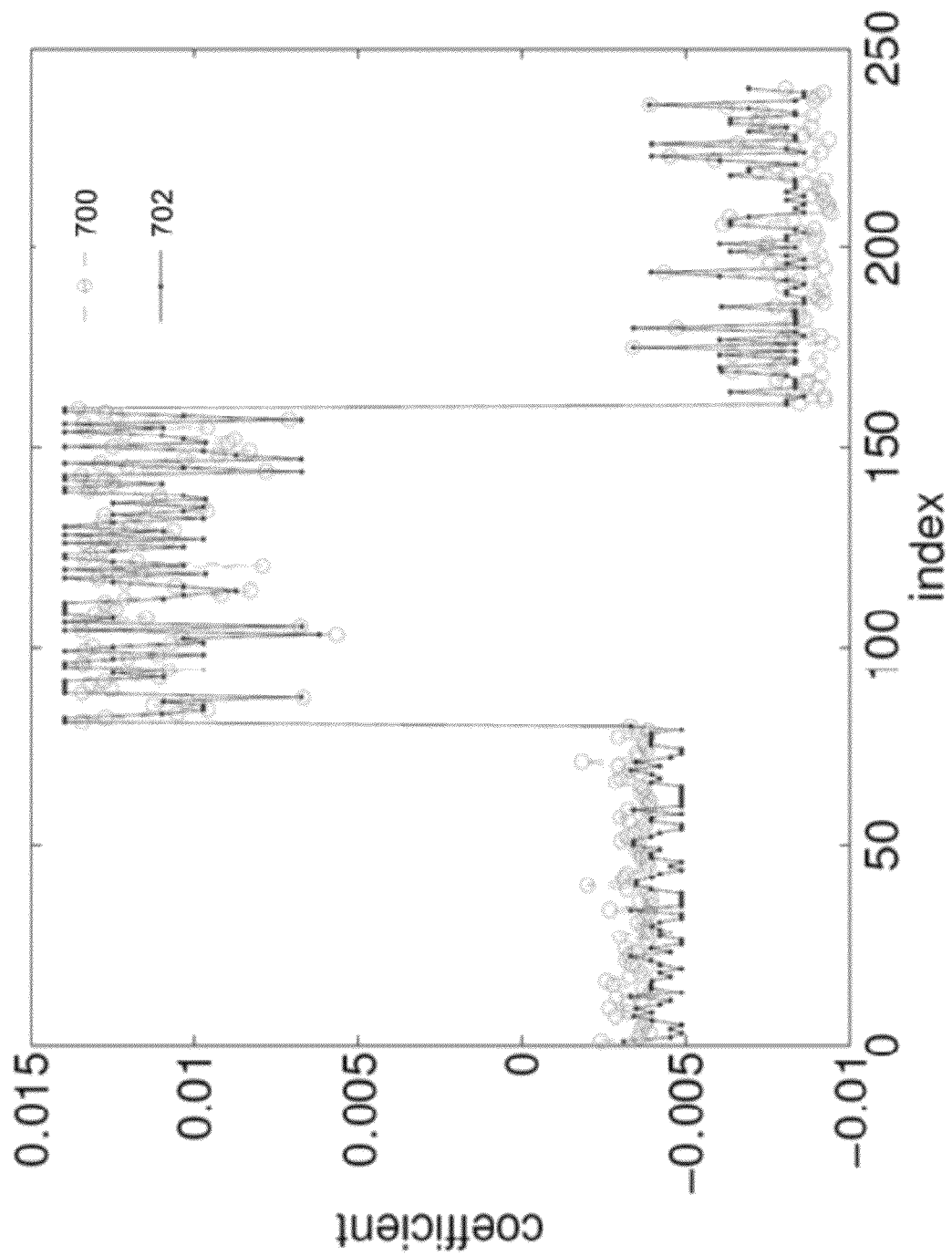
FIG. 7 depicts a comparison between the eigenvector corresponding to the second principal component of the dataset of FIG. 5 calculated using the full dataset and calculated using the method presented in FIGS. 2 and 3.

As shown with reference to FIG. 4, the two methods yield similar results relative to the magnitude of the 25 largest eigenvalues. As a result, the method described with reference to FIGS. 2 and 3 yields accurate results. As further shown with reference to FIGS. 6 and 7, the two methods yield similar results relative to the eigenvector corresponding to the first principal component of the dataset and relative to the eigenvector corresponding to the second principal component of the dataset, respectively. With reference to FIG. 6, a first curve 600 shows the eigenvector corresponding to the first principal component calculated for the dataset using the direct approach, and a second curve 602 shows the eigenvector corresponding to the first principal component calculated for the dataset using the method described with reference to FIGS. 2 and 3. With reference to FIG. 7, a first curve 700 shows the eigenvector corresponding to the second principal component calculated for the dataset using the direct approach, and a second curve 702 shows the eigenvector corresponding to the second principal component calculated for the dataset using the method described with reference to FIGS. 2 and 3.

Though not shown with reference to FIGS. 4, 6, and 7, the main difference in the resulting projection maps was that the first three eigenvectors pointed in the opposite direction. In any case, the ambiguity in the direction of the eigenvectors is not detrimental to any subsequent analysis or display of the derived parameters. After inverting the direction of the eigenvectors where appropriate, the two leading eigenvectors estimated using the method described with reference to FIGS. 2 and 3 are very close to those computed directly from K.

The method described with reference to FIGS. 2 and 3 provides a much faster computation and has lower memory requirements as shown in Table I below.

TABLE I

| Method | Metric | Sampling | Computing K | Eigen-decomposition | Computing $K^{test}$ & projections | Total |
|---|---|---|---|---|---|---|
| Direct approach | Time (ms) | — | 23.4 | 86.4 | 23.7 | 133.5 |
|  | Memory (KB) | — | 454.4 | — | 683.6 | 1126.9 |
| FIGS. 2 & 3 | Time (ms) | 6.5 | 0.3 | 0.9 | 1.3 | 8.9 |
|  | Memory (KB) | 1.9 | 9.1 | — | 96.8 | 106.8 |

The comparison was executed in Matlab, developed by The MathWorks, Inc., running in single-thread mode. The code was fully vectorized to take advantage of Matlab's speed, except for the sampling algorithm described with reference to FIG. 3, which required a loop through the data. The two approaches were compared in Table I, with the results averaged over 15 realizations of the dataset. Using the method described with reference to FIGS. 2 and 3 resulted in an average execution runtime improvement of 15× and used less than 10% of the memory required by the direct approach. The improvements were achieved because the representative dataset included, on average, about 34 points instead of the full dataset of 240 data points.

Figure 8:
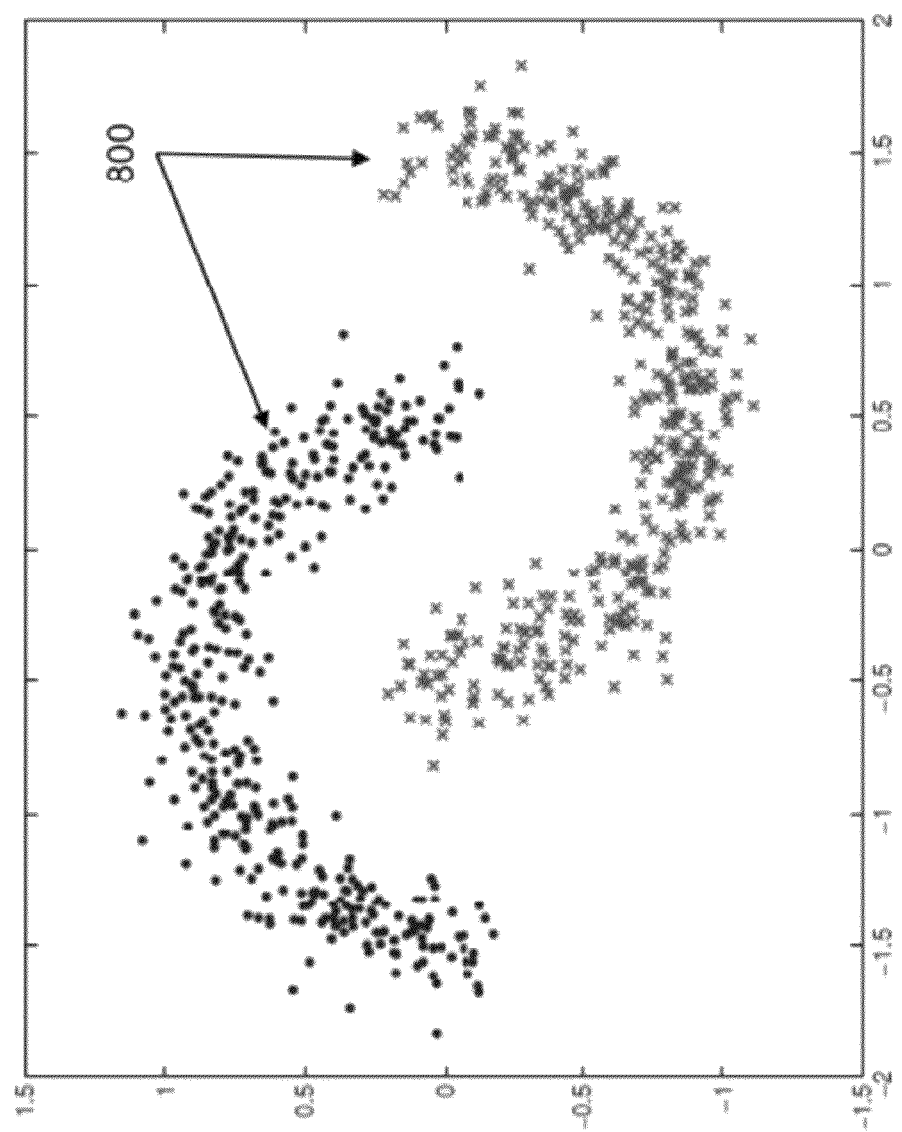
FIG. 8 depicts a "two moons" dataset with noise standard deviation 0.11.

The method described with reference to FIGS. 2 and 3 also was applied in spectral clustering of the "two moons" synthetic dataset which included 800 data points. In conducting the comparisons, the "two moons" synthetic dataset was used with different levels of Gaussian additive noise, with standard deviation between 0.1 and 0.16. As an example, data points 800, shown with reference to FIG. 8, were determined for the two moons" synthetic dataset using a noise standard deviation of 0.11. Four methods for performing the spectral clustering were used: 1) the direct computation approach, 2) the method described with reference to FIGS. 2 and 3, 3) the method using the sampling method described with reference to FIG. 3 and the Nyström approximation as described in a paper by C. Fowlkes, S. Belongie, F. Chung, and J. Malik titled "Spectral grouping using the Nyström method" and published in IEEE Transactions on Pattern Analysis and Machine Intelligence, vol. 26, no. 2, pp. 214-225, February 2004 (Fowlkes et al.), and 4) the method described in Fowlkes et al. Although the Nÿstrom approximation method is commonly associated with random sampling, as described in the paper by C. K. I. Williams and M. Seeger titled "Using the Nyström method to speed up kernel machines" and published in *Advances in Neural Information Processing Systems*, Vancouver, BC, Canada, December 2000 and Fowlkes et al., this does not need to be the case. Thus, the difference between method 3) and method 4) is that method 4) used random sampling and method 3) used the sampling method described with reference to FIG. 3 to define the representative dataset.

The affinity matrix was computed as the data kernel matrix using the Gaussian kernel $\kappa_o(x_i, x_j) = \exp(-\|x_i - x_j\|^2 / 2\sigma^2)$. The kernel size $\sigma$ was set to 0.12 to minimize the connection of points between clusters, as is typically done as known to a person of skill in the art. The sampling parameter, $\delta$ was set to 0.12, or equal to $\sigma$. Of course, smaller values of $\delta$ could have been used for even better accuracy. After spectral embedding, the points were clustered using k-means. The statistics were estimated for each noise standard deviation over a set of 50 realizations of the dataset.

Figure 9:
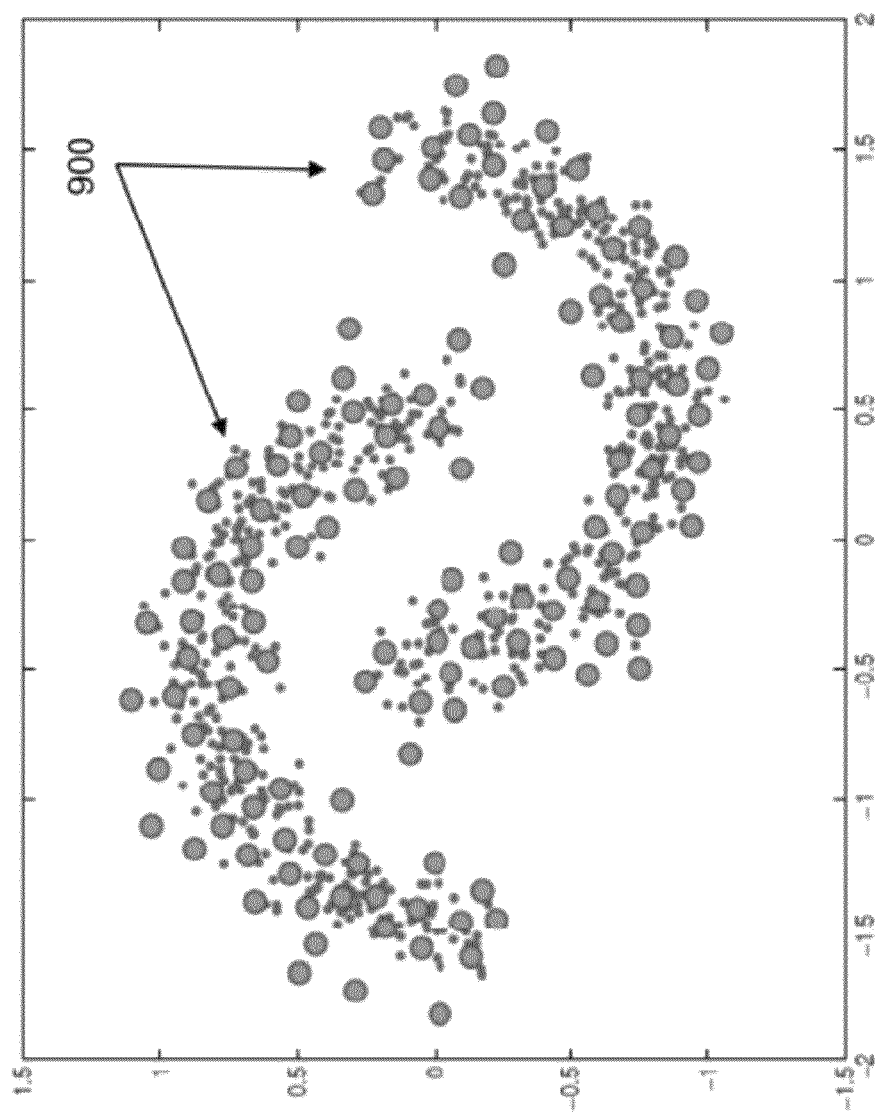
FIG. 9 depicts the representative dataset determined from the "two moons" dataset of FIG. 8 using the method presented in FIG. 3 with a sampling parameter of 0.12.
Figure 10:
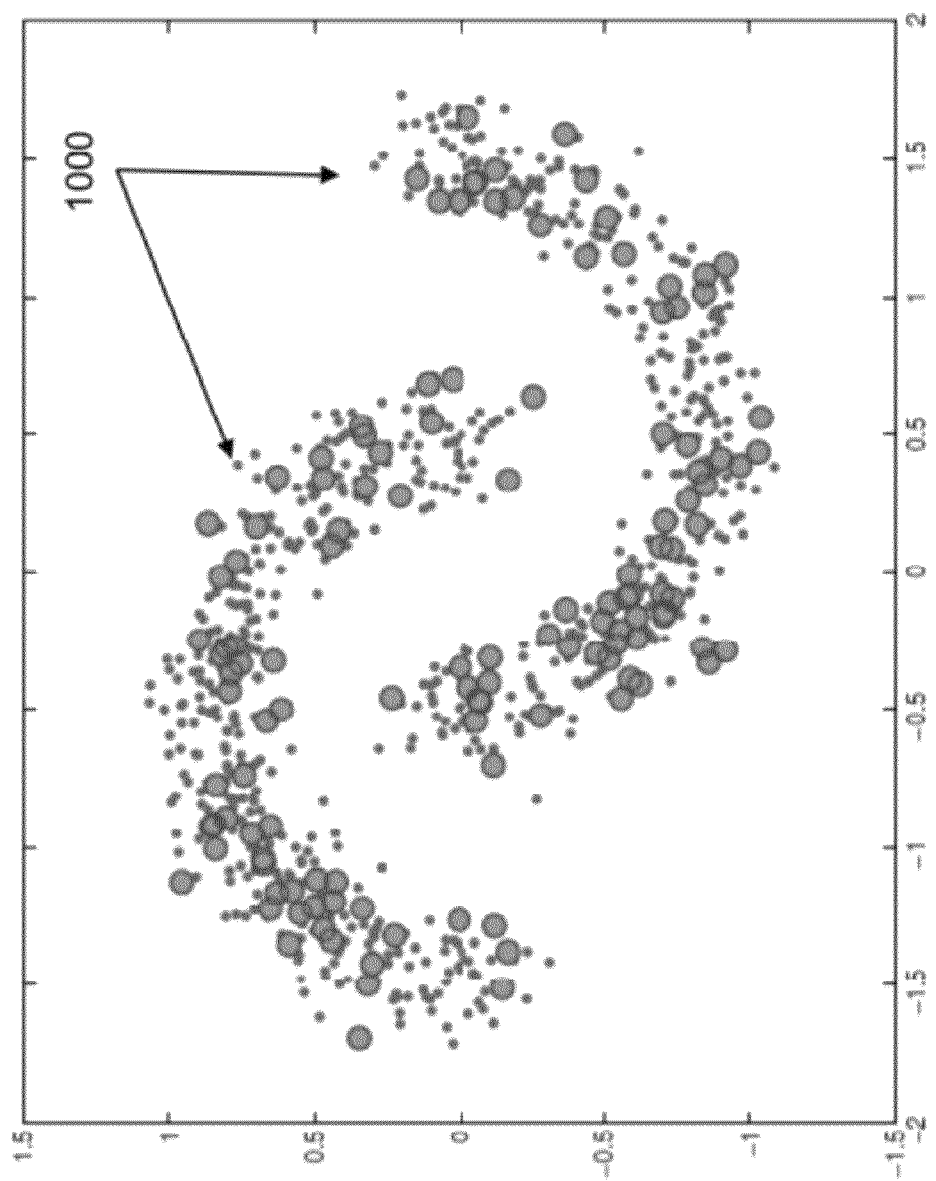
FIG. 10 depicts a sampled dataset determined from the "two moons" dataset of FIG. 8 using random sampling.

Data points 900, shown with reference to FIG. 9, were determined using a noise standard deviation of 0.11 and the sampling method described with reference to FIG. 3. Data points 1000, shown with reference to FIG. 10, were determined using a noise standard deviation of 0.11 and random sampling of the dataset shown with reference to FIG. 8.

Figure 11:
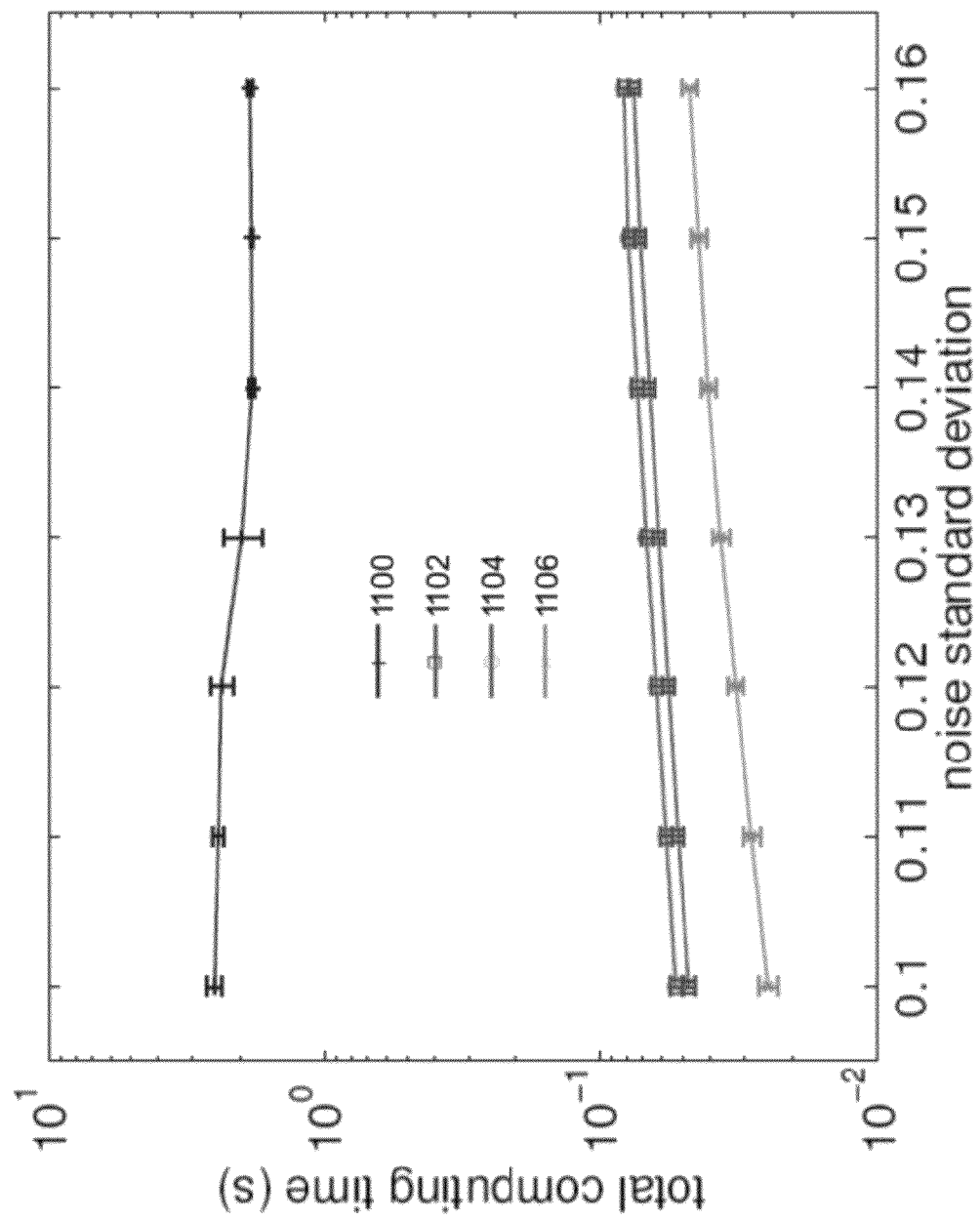
FIG. 11 depicts a comparison of the total computing time required to cluster the "two moons" dataset of FIG. 8 using four different methods.
Figure 12:
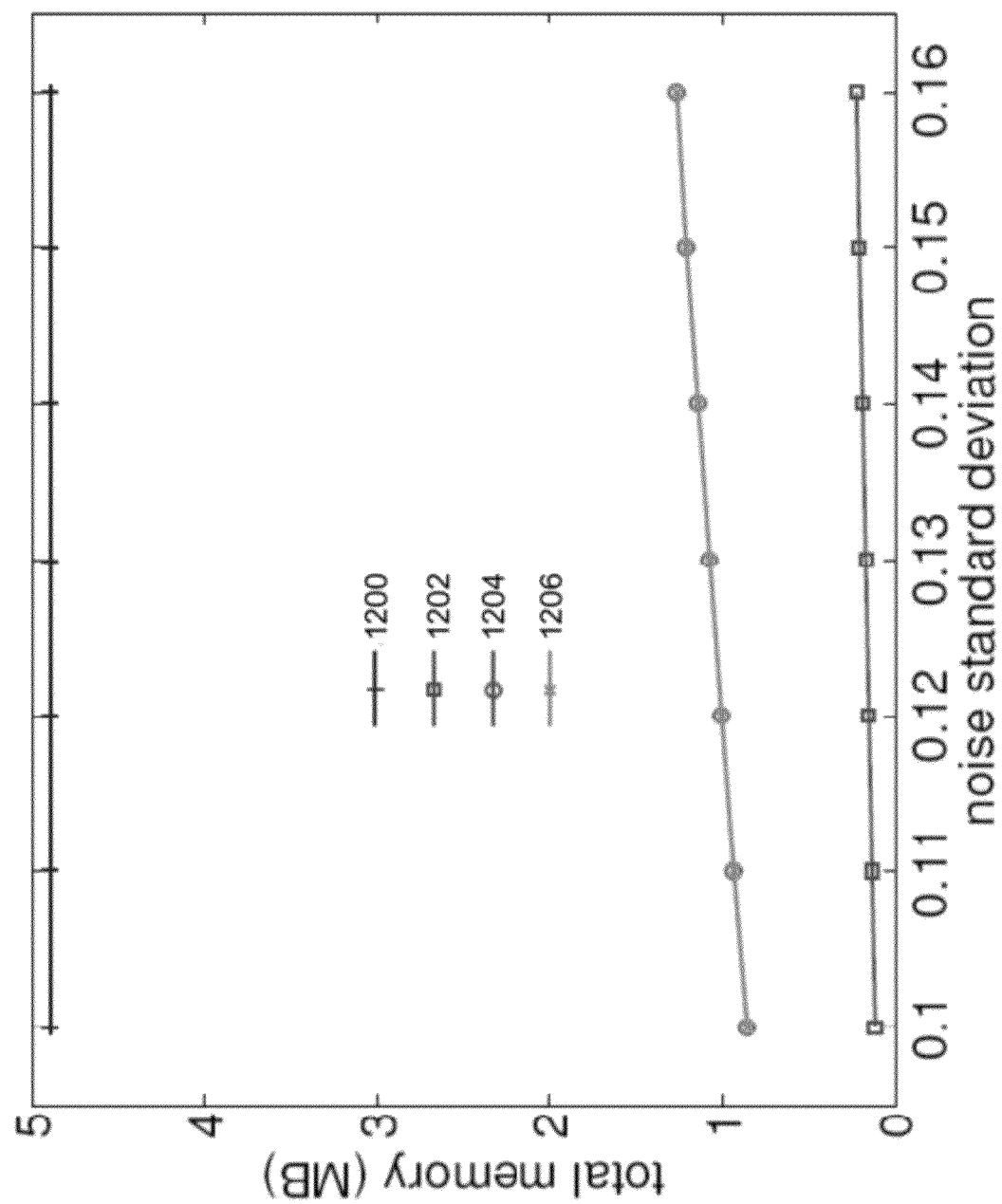
FIG. 12 depicts a comparison of the total memory required to cluster the "two moons" dataset of FIG. 8 using the four different methods.

The average computing time required for the four different methods are shown with reference to FIG. 11 for the different levels of Gaussian additive noise, with standard deviation between 0.1 and 0.16. A first computing curve 1100 was determined using method 1), a second computing curve 1102 was determined using method 2), a third computing curve 1104 was determined using method 3), and a fourth computing curve 1106 was determined using method 4). The average memory requirements for the four different methods are shown with reference to FIG. 12 for the different levels of Gaussian additive noise, with standard deviation between 0.1 and 0.16. A first memory curve 1200 was determined using method 1), a second memory curve 1202 was determined using method 2), a third memory curve 1204 was determined using method 3), and a fourth memory curve 1206 was determined using method 4).

The computing time and memory required using method 1) was approximately 2 seconds and 4.9 megabytes (MB), respectively. The computing time and memory requirements for methods 2), 3), and 4) increased with the noise standard deviation because the data points were increasingly "spread out" and $\delta$ was fixed, meaning that more representative points were needed to cover the data space. For $\delta=0.12$, the average number of data points in the representative dataset ranged from 120 to 168, representing a reduction in the number of points by 85-79%. In spite of the increase in the number of data points in the representative dataset, method 2) was still very fast compared to the direct approach with a speedup of 24.6-52.3 times. The approach using method 3) was slightly slower than using method 2) due to the computation of $K^{test}$, which is needed by the Nyström approximation. The approaches using methods 2) and 3) were slower than using method 4) because random sampling is faster than sampling using the method described with reference to FIG. 3 because virtually no computation is required to select the representative dataset using random sampling. For larger datasets, the computation time tends to be dominated by the eigendecomposition of the kernel matrix, which decreases the gap in computing time between methods 2) and 4). Method 2) required the lowest amount of memory, only about 2.4-4.6% of the memory required using method 1). In contrast, using methods 3) and 4) required significantly more memory because of the need to store $K^{test}$, using about 17.5-25.8% of the memory required using method 1).

Figure 13:
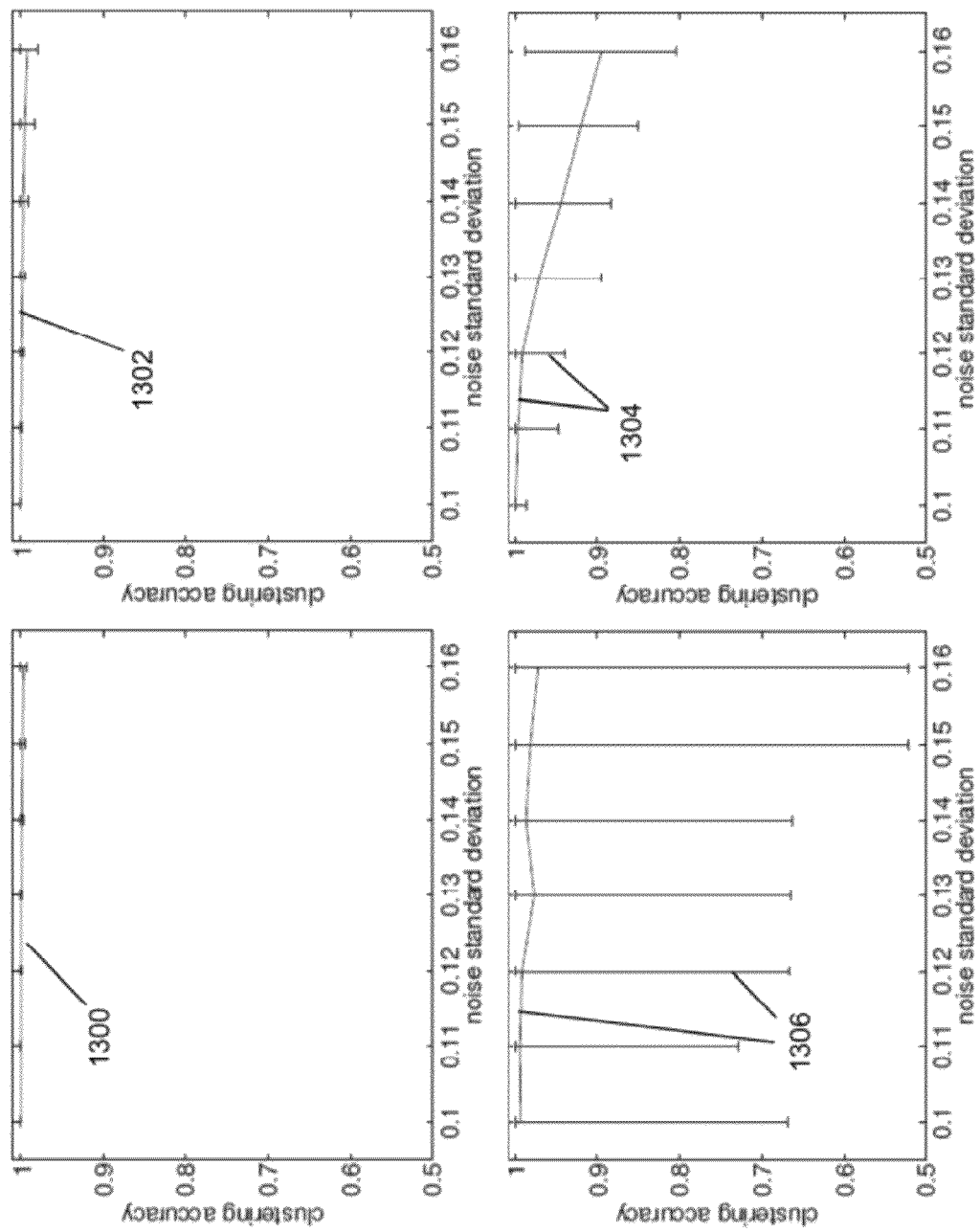
FIG. 13 depicts a comparison of the clustering accuracy achieved for the "two moons" dataset of FIG. 8 using the four different methods.

A comparison of the accuracy as a function of the noise standard deviation and the method is shown with reference to FIG. 13. A first accuracy curve 1300 was determined using method 1), a second accuracy curve 1302 was determined using method 2), a third accuracy curve 1304 was determined using method 3), and a fourth accuracy curve 1306 was determined using method 4). The accuracy curves show the average accuracy, the lowest accuracy, and the highest accuracy achieved using each method over the 50 realizations of the dataset for each noise standard deviation value. As expected, the clustering accuracy decreases as the noise level increases for all four methods though the accuracy resulting from computing directly on the whole dataset is only slightly affected as shown by first accuracy curve 1300. Similarly, the accuracy shown by second accuracy curve 1302 using method 2) decreases, but is only slightly worse than that using method 1).

The same number of data points in the representative dataset selected using method 2) were randomly selected from the whole dataset to generate the results shown in fourth accuracy curve 1306. The most striking result was that extremely low accuracy can be obtained using method 4) because random sampling does not ensure a uniform coverage of the data space. As illustrated by the sampled points shown in the lower "moon" with reference to FIG. 10, there is a possibility that the random sampling artificially introduces a separation between samples even though they are connected by a region of high intensity of the distribution. Of course, the number of representative data points could have been increased, but this would lead to an increase in computation time and memory required. Although method 3) yielded the worst results on average, the worst case accuracies achieved using method 3) were considerably better than those yielded using method 4). Because the only difference between methods 3) and 4) was the sampling algorithm, this result demonstrates the importance of ensuring that the sampling algorithm accurately covers the relevant regions of the data space. On the other hand, in comparison to the result using method 2), the comparison demonstrated that the improved performance results from use of the weighting matrix. As shown in FIG. 13, this is particularly important as the noise standard deviation increases because more representative points are placed close to the separation between the two clusters. However, the weighting matrix accurately reflected the data distribution around the separation, which resulted in a more accurate clustering.

Additional results were obtained using the "shuttle statlog" dataset available from the UCI Machine Learning Repository at http://archive.ics.uci.edu/ml. The dataset included a total of 58,000 data points distributed over seven classes. In addition, the dataset is considerably unbalanced, with about 80% of the data belonging to one of the classes making the dataset quite challenging for unsupervised learning algorithms because the priors have to be completely inferred from the data. This characteristic is particularly important for the purpose of this comparison because if a technique does not appropriately reflect the data distribution, the clustering accuracy will deteriorate accordingly.

As before, the affinity matrix was computed as the data kernel matrix using the Gaussian kernel $\kappa_o(x_i,x_j)=\exp(-\|x_i-x_j\|^2/2\sigma^2)$. As pre-processing, the data features were shifted and scaled to have zero mean and unit variance. The results were obtained with the kernel size set to $\sigma=8$, though values within the interval [4, 12] yielded similar results. Accordingly, the sampling parameter was set to $\delta=8$, which yielded an average of 48 data points in the representative dataset. K-means was used to cluster the points after spectral embedding. The results using method 2) and method 4) were estimated over 30 different sampling realizations. In the case of method 2), this was obtained by shuffling the data before sampling. As before, all simulations were run in single-thread mode for profiling of computation time.

TABLE II

| Method | Accuracy | Computing time (s) | Memory |
|---|---|---|---|
| k-means | 43.90% | 10.1 | 3.10 MB |
| Method 1) | 78.60% | 1468.8 | 25.07 GB |
| Method 2) | 78.58 ± 0.01% | 4.3 | 9.76 MB |
| Method 4) | 63.91 ± 13.82% | 7.1 | 31.44 MB |

The results are shown in Table II. For reference, the accuracy using k-means directly on the input data was included. By comparing the accuracy using k-means and method 1) (the direct approach using all of the data), the improvement due to the nonlinear clustering ability of spectral clustering is clear. Nevertheless, the computing time and memory required by method 1) are prohibitively high. However, the performance using method 2) is comparable to that using method 1). Moreover, using method 2), the clustering was achieved in only 4.3 seconds, a speedup of more than 340 times, and used less than 10 MB of memory. In fact, the computing time using method 2) was even faster than directly applying k-means. Although k-means was also used in the spectral clustering algorithm and the same number of points needed to be clustered in spectral clustering, the spectral embedding placed clusters approximately 90 degrees apart. This knowledge was used to obtain good initial estimates of the cluster centers, speeding up the convergence of k-means in spectral clustering using method 2).

As observed in the previous example, using method 4) yielded considerably worse results. Moreover, the accuracy was highly variable across different random sampling runs, as shown with reference to FIG. 13. In contrast, the accuracy using method 2) was consistently high and nearly as good as using method 1). In addition, method 4) required much more memory, due to the need to store the $K^{test}$ matrix to compute the eigenvector coefficients for all of the points. Also, although the sampling is very fast using method 4), evaluation of the $K^{test}$ matrix added to the computation time.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system comprising:
a processor; and
a non-transitory computer-readable medium operably coupled to the processor, the computer-readable medium having computer-readable instructions stored thereon that, when executed by the processor, cause the system to
define a representative dataset from a dataset by adding a data point of the dataset to the representative dataset if a minimum distance between the data point and each data point of the representative dataset is greater than a sampling parameter and adding the data point of the dataset to a refinement dataset if the minimum distance between the data point and each data point of the representative dataset is less than the sampling parameter and greater than half the sampling parameter, wherein the representative dataset includes a first plurality of data points and the dataset includes a second plurality of data points, and the number of the first plurality of data points is less than the number of the second plurality of data points;
define a weighting matrix, wherein the weighting matrix includes a weight value calculated for each of the first plurality of data points based on a determined number of the second plurality of data points associated with a respective data point of the first plurality of data points, and further wherein the weight value for a closest data point of the representative dataset is updated if the minimum distance between the data point and each data point of the representative dataset is less than half the sampling parameter; and execute a machine learning algorithm using the defined representative dataset and the defined weighting matrix applied in an approximation for computation of a full kernel matrix of the dataset to generate a parameter characterizing the dataset.

2. The system of claim 1, wherein the sampling parameter is defined based on a kernel size.

3. The system of claim 2, wherein the sampling parameter is defined in a range of $[\sigma/2, \sigma]$ where $\sigma$ is the kernel size.

4. The system of claim 1, wherein defining the representative dataset further comprises, after processing each of the second plurality of data points to define the refinement dataset, calculating a second minimum distance between a data point of the refinement dataset and each data point of the representative dataset; and updating the weight value for the closest data point of the representative dataset determined based on the calculated second minimum distance.

5. The system of claim 1, wherein the machine learning algorithm performs kernel principle component analysis and the approximation for the M largest eigenvalues and corresponding eigenvectors of the eigendecomposition of the full kernel matrix of the dataset is defined by a diagonal matrix of eigenvalues $\tilde{U}$ and a matrix of corresponding eigenvectors $EW^{-1/2}\tilde{V}$, where $\tilde{U}$ is a diagonal matrix of eigenvalues and $\tilde{V}$ is a matrix of corresponding eigenvectors for the eigendecomposition of $W^{1/2}\tilde{K}_R W^{1/2}$, E is an N×M matrix with the (i,m) entry equal to one if the i-th data point of the dataset has been assigned to the m-th data point of the representative dataset, and zero otherwise, W is the weighting matrix, $$\tilde{K}_R = \left(I_M - \frac{1}{N} 1_{M \times M} W\right) K_R \left(I_M - \frac{1}{N} W 1_{M \times M}\right),$$

M is the number of the first plurality of data points, N is the number of the second plurality of data points, $I_M$ is an identity matrix, $1_{M \times M}$ is the M×M matrix of all ones, and $K_R$ is the kernel matrix of the representative dataset.

6. The system of claim 1, wherein the machine learning algorithm performs spectral clustering and the approximation for the M largest eigenvalues and corresponding eigenvectors of the eigendecomposition of the full kernel matrix of the dataset is defined by a diagonal matrix of eigenvalues $\check{U}$ and a matrix of corresponding eigenvectors $EW^{-1/2}\check{V}$, where $\check{U}$ is a diagonal matrix of eigenvalues and $\check{V}$ is a matrix of corresponding eigenvectors for the eigendecomposition of $W^{1/2} D_R^{-1/2} K_R D_R^{-1/2} W^{1/2}$, E is an N×M matrix with the (i,m) entry equal to one if the i-th data point of the dataset has been assigned to the m-th data point of the representative dataset, and zero otherwise, W is the weighting matrix, M is the number of the first plurality of data points, N is the number of the second plurality of data points, $D_R$ is an M×M diagonal matrix with the i-th diagonal entry given by, $$[D_R]_{ii} = \sum_{j=1}^{M} w_j \kappa(x'_i, x'_j),$$

where $w_j$ is the weight associated with the j-th element of the representative dataset, $\kappa$ is a kernel function, and $K_R$ is the kernel matrix of the representative dataset.

7. A non-transitory computer-readable medium having stored thereon computer-readable instructions that when executed by a computing device cause the computing device to:

define a representative dataset from a dataset by adding a data point of the dataset to the representative dataset if a minimum distance between the data point and each data point of the representative dataset is greater than a sampling parameter and adding the data point of the dataset to a refinement dataset if the minimum distance between the data point and each data point of the representative dataset is less than the sampling parameter and greater than half the sampling parameter, wherein the representative dataset includes a first plurality of data points and the dataset includes a second plurality of data points, and the number of the first plurality of data points is less than the number of the second plurality of data points;

define a weighting matrix, wherein the weighting matrix includes a weight value calculated for each of the first plurality of data points based on a determined number of the second plurality of data points associated with a respective data point of the first plurality of data points, and further wherein the weight value for a closest data point of the representative dataset is updated if the minimum distance between the data point and each data point of the representative dataset is less than half the sampling parameter; and execute a machine learning algorithm using the defined representative dataset and the defined weighting matrix applied in an approximation for a computation of a full kernel matrix of the dataset to generate a parameter characterizing the dataset.

8. The computer-readable medium of claim 7, wherein the sampling parameter is defined based on a kernel size.

9. The computer-readable medium of claim 8, wherein the sampling parameter is defined in a range of $[\sigma/2, \sigma]$ where $\sigma$ is the kernel size.

10. The computer-readable medium of claim 7, wherein defining the representative dataset further comprises, after processing each of the second plurality of data points to define the refinement dataset, calculating a second minimum distance between a data point of the refinement dataset and each data point of the representative dataset; and updating the weight value for the closest data point of the representative dataset determined based on the calculated second minimum distance.

11. The computer-readable medium of claim 7, wherein the machine learning algorithm performs kernel principle component analysis and the approximation for the M largest eigenvalues and corresponding eigenvectors of the eigendecomposition of the full kernel matrix of the dataset is defined by a diagonal matrix of eigenvalues $\tilde{U}$ and a matrix of corresponding eigenvectors $EW^{-1/2}\tilde{V}$, where $\tilde{U}$ is a diagonal matrix of eigenvalues and $\tilde{V}$ is a matrix of corresponding eigenvectors for the eigendecomposition of $W^{1/2}\tilde{K}_R W^{1/2}$, E is an N×M matrix with the (i,m) entry equal to one if the i-th data point of the dataset has been assigned to the m-th data point of the representative dataset, and zero otherwise, W is the weighting matrix, $$\tilde{K}_R = \left(I_M - \frac{1}{N}1_{M \times M}W\right)K_R\left(I_M - \frac{1}{N}W1_{M \times M}\right),$$

M is the number of the first plurality of data points, N is the number of the second plurality of data points, $I_M$ is an identity matrix, $1_{M \times M}$ is the M×M matrix of all ones, and $K_R$ is the kernel matrix of the representative dataset.

12. The computer-readable medium of claim 7, wherein the machine learning algorithm performs spectral clustering and the approximation for the M largest eigenvalues and corresponding eigenvectors of the eigendecomposition of the full kernel matrix of the dataset is defined by a diagonal matrix of eigenvalues $\check{U}$ and a matrix of corresponding eigenvectors $EW^{-1/2}\check{V}$, where $\check{U}$ is a diagonal matrix of eigenvalues and $\check{V}$ is a matrix of corresponding eigenvectors for the eigendecomposition of $W^{1/2}D_R^{-1/2}K_RD_R^{-1/2}W^{1/2}$, E is an N×M matrix with the (i,m) entry equal to one if the i-th data point of the dataset has been assigned to the m-th data point of the representative dataset, and zero otherwise, W is the weighting matrix, M is the number of the first plurality of data points, N is the number of the second plurality of data points, $D_R$ is an M×M diagonal matrix with the i-th diagonal entry given by, $$[D_R]_{ii} = \sum_{j=1}^{M} w_j \kappa(x'_i, x'_j),$$

where $w_j$ is the weight associated with the j-th element of the representative dataset, $\kappa$ is a kernel function, and $K_R$ is the kernel matrix of the representative dataset.

13. A method of characterizing a dataset, the method comprising:
   defining, by a computing device, a representative dataset from a dataset by adding a data point of the dataset to the representative dataset if a minimum distance between the data point and each data point of the representative dataset is greater than a sampling parameter and adding the data point of the dataset to a refinement dataset if the minimum distance between the data point and each data point of the representative dataset is less than the sampling parameter and greater than half the sampling parameter, wherein the representative dataset includes a first plurality of data points and the dataset includes a second plurality of data points, and the number of the first plurality of data points is less than the number of the second plurality of data points;
   defining, by the computing device, a weighting matrix, wherein the weighting matrix includes a weight value calculated for each of the first plurality of data points based on a determined number of the second plurality of data points associated with a respective data point of the first plurality of data points, and further wherein the weight value for a closest data point of the representative dataset is updated if the minimum distance between the data point and each data point of the representative dataset is less than half the sampling parameter; and
   executing, by the computing device, a machine learning algorithm using the defined representative dataset and the defined weighting matrix applied in a approximation for a computation of a full kernel matrix of the dataset to generate a parameter characterizing the dataset.

14. The method of claim 13, wherein the sampling parameter is defined based on a kernel size.

15. The method of claim 14, wherein the sampling parameter is defined in a range of [σ/2,σ] where σ is the kernel size.

16. The method of claim 13, wherein defining the representative dataset further comprises, after processing each of the second plurality of data points to define the refinement dataset,
   calculating a second minimum distance between a data point of the refinement dataset and each data point of the representative dataset; and
   updating the weight value for the closest data point of the representative dataset determined based on the calculated second minimum distance.

17. The method of claim 13, wherein the machine learning algorithm performs kernel principle component analysis and the approximation for the M largest eigenvalues and corresponding eigenvectors of the eigendecomposition of the full kernel matrix of the dataset is defined by a diagonal matrix of eigenvalues $\tilde{U}$ and a matrix of corresponding eigenvectors $EW^{-1/2}\tilde{V}$, where $\tilde{U}$ is a diagonal matrix of eigenvalues and $\tilde{V}$ is a matrix of corresponding eigenvectors for the eigendecomposition of $W^{1/2}\tilde{K}_RW^{1/2}$, E is an N×M matrix with the (i,m) entry equal to one if the i-th data point of the dataset has been assigned to the m-th data point of the representative dataset, and zero otherwise, W is the weighting matrix, $$\tilde{K}_R = \left(I_M - \frac{1}{N}1_{M \times M}W\right)K_R\left(I_M - \frac{1}{N}W1_{M \times M}\right),$$

M is the number of the first plurality of data points, N is the number of the second plurality of data points, $I_M$ is an identity matrix, $1_{M \times M}$ is the M×M matrix of all ones, and $K_R$ is the kernel matrix of the representative dataset.

18. The method of claim 13, wherein the machine learning algorithm performs spectral clustering and the approximation for the M largest eigenvalues and corresponding eigenvectors of the eigendecomposition of the full kernel matrix of the dataset is defined by a diagonal matrix of eigenvalues $\check{U}$ and a matrix of corresponding eigenvectors $EW^{-1/2}\check{V}$, where $\check{U}$ is a diagonal matrix of eigenvalues and $\check{V}$ is a matrix of corresponding eigenvectors for the eigendecomposition of $W^{1/2}D_R^{-1/2}K_RD_R^{-1/2}W^{1/2}$, E is an N×M matrix with the (i,m) entry equal to one if the i-th data point of the dataset has been assigned to the m-th data point of the representative dataset, and zero otherwise, W is the weighting matrix, M is the number of the first plurality of data points, N is the number of the second plurality of data points, $D_R$ is an M×M diagonal matrix with the i-th diagonal entry given by, $$[D_R]_{ii} = \sum_{j=1}^{M} w_j \kappa(x'_i, x'_j),$$

where $w_j$ is the weight associated with the j-th element of the representative dataset, $\kappa$ is a kernel function, and $K_R$ is the kernel matrix of the representative dataset.

* * * * *